US011832184B2

United States Patent
Cho et al.

(10) Patent No.: US 11,832,184 B2
(45) Date of Patent: Nov. 28, 2023

(54) SYSTEM AND METHOD FOR EXCHANGING DATA OR SIGNALS FOR VEHICLE

(71) Applicant: LG Electronics Inc., Seoul (KR)

(72) Inventors: Sungdong Cho, Seoul (KR); Donghwi Kim, Seoul (KR); Hakseong Kim, Seoul (KR); Min Song, Seoul (KR)

(73) Assignee: LG Electronics Inc., Seoul (KR)

( * ) Notice: Subject to any disclaimer, the term of this patent is extended or adjusted under 35 U.S.C. 154(b) by 227 days.

(21) Appl. No.: 17/413,409

(22) PCT Filed: Dec. 13, 2018

(86) PCT No.: PCT/KR2018/015825
§ 371 (c)(1),
(2) Date: Jun. 11, 2021

(87) PCT Pub. No.: WO2020/122280
PCT Pub. Date: Jun. 18, 2020

(65) Prior Publication Data
US 2022/0060988 A1   Feb. 24, 2022

(51) Int. Cl.
*H04W 52/02* (2009.01)
*H04L 12/40* (2006.01)
(Continued)

(52) U.S. Cl.
CPC ......... *H04W 52/0235* (2013.01); *H04L 12/40* (2013.01); *H04L 2012/40215* (2013.01)

(58) Field of Classification Search
CPC ......... H04W 52/0209; H04W 52/0225; H04W 52/0235; H04W 4/38; H04W 4/40;
(Continued)

(56) References Cited

U.S. PATENT DOCUMENTS 4,449,248 A * 5/1984 Leslie ............... H04B 1/40
340/9.1
5,635,921 A * 6/1997 Maxwell ........... G08G 1/0965
340/904
(Continued)

FOREIGN PATENT DOCUMENTS

KR 20160062203 6/2016
WO WO2011160141 12/2011
WO WO2015013075 1/2015

OTHER PUBLICATIONS

International Search Report in International Appln. No. PCT/KR2018/015825, dated Sep. 20, 2019, 7 pages (with English translation).

*Primary Examiner* — Jenee Holland
(74) *Attorney, Agent, or Firm* — Fish & Richardson P.C.

(57) ABSTRACT

Disclosed is a vehicle system including: a first electronic device configured to receive a radio frequency (RF) signal from an external device and process the RF signal to generate data; and a second electronic device configured to receive the data through an Ethernet communication method and perform an operation based on the data, wherein the first electronic device includes: a first signal detector configured to receive a first wake-up signal in a power saving mode state; and a first Ethernet interface configured to attempt an Ethernet connection with the second electronic device when the first signal detector receives the first wakeup signal.

12 Claims, 8 Drawing Sheets

(51) Int. Cl.
*H04L 12/413* (2006.01)
*H04L 65/40* (2022.01)
*H04L 67/12* (2022.01)

(58) Field of Classification Search
CPC .......... H04W 4/44; H04W 4/46; H04L 12/40; H04L 2012/40215
See application file for complete search history.

(56) References Cited

U.S. PATENT DOCUMENTS

| | | | | |
|---|---|---|---|---|
| 5,955,968 | A * | 9/1999 | Bentrott | G08G 1/087 455/67.15 |
| 6,028,537 | A * | 2/2000 | Suman | B60K 35/00 340/988 |
| 6,622,178 | B1 * | 9/2003 | Burke | G06F 1/3209 713/300 |
| 6,624,750 | B1 * | 9/2003 | Marman | G08B 26/007 340/521 |
| 7,899,923 | B2 * | 3/2011 | Siegmund | H04L 61/59 709/224 |
| 8,373,578 | B1 * | 2/2013 | Sikora | G08G 1/087 340/904 |
| 9,055,532 | B2 * | 6/2015 | Park | H04W 52/0235 |
| 9,207,740 | B2 * | 12/2015 | Manav | G06F 1/3209 |
| 9,706,377 | B2 * | 7/2017 | Ponukumati | H04W 52/0216 |
| 9,991,694 | B1 * | 6/2018 | Handshoe | G01R 31/54 |
| 10,107,888 | B1 * | 10/2018 | Choi | H04L 12/40163 |
| 2004/0203554 | A1 * | 10/2004 | Simon | H04B 1/3877 455/345 |
| 2005/0070250 | A1 * | 3/2005 | Scalisi | H04M 15/00 455/411 |
| 2007/0120664 | A1 * | 5/2007 | Bilbrey | G08B 21/24 340/539.32 |
| 2012/0119902 | A1 * | 5/2012 | Patro | H04W 52/0238 340/502 |
| 2013/0145191 | A1 * | 6/2013 | Hung | G06F 1/329 713/323 |
| 2013/0159489 | A1 * | 6/2013 | Cha | H04L 65/611 709/223 |
| 2014/0012947 | A1 * | 1/2014 | Schaller | H04L 67/02 709/217 |
| 2014/0031002 | A1 * | 1/2014 | Ranki | H04W 52/0209 455/404.2 |
| 2014/0119381 | A1 * | 5/2014 | Diab | H04B 15/00 370/431 |
| 2014/0161141 | A1 * | 6/2014 | Lusted | H04L 12/12 370/468 |
| 2014/0215491 | A1 | 7/2014 | Addepalli et al. | |
| 2014/0227991 | A1 * | 8/2014 | Breton | G08G 1/0965 455/404.2 |
| 2014/0335490 | A1 * | 11/2014 | Baarman | A61B 5/1118 434/236 |
| 2015/0079989 | A1 * | 3/2015 | Tambaram Kailasam | H04W 36/0088 455/436 |
| 2015/0131477 | A1 * | 5/2015 | Balbierer | H04L 12/12 370/254 |
| 2016/0011648 | A1 * | 1/2016 | Zhang | H04L 43/0817 713/323 |
| 2016/0065298 | A1 * | 3/2016 | Nakagawa | H04B 7/15528 370/315 |
| 2016/0088455 | A1 | 3/2016 | Bozik et al. | |
| 2017/0024220 | A1 * | 1/2017 | Grimme | G06F 9/442 |
| 2017/0068305 | A1 * | 3/2017 | Yu | G06F 1/3287 |
| 2017/0180929 | A1 * | 6/2017 | Cavendish | H04W 4/023 |
| 2017/0180963 | A1 * | 6/2017 | Cavendish | H04W 52/0229 |
| 2017/0339640 | A1 * | 11/2017 | Krishnamoorthy | H04W 52/0225 |
| 2018/0103121 | A1 * | 4/2018 | Yun | H04L 67/34 |
| 2018/0198545 | A1 * | 7/2018 | Aichriedler | H04Q 9/04 |
| 2018/0241583 | A1 * | 8/2018 | Krieger | H04L 12/12 |
| 2018/0293523 | A1 * | 10/2018 | Bergdale | G06Q 20/405 |
| 2019/0020991 | A1 * | 1/2019 | Hamilton | H04W 88/06 |
| 2021/0368444 | A1 * | 11/2021 | Wang | H04W 72/0453 |
| 2022/0417346 | A1 * | 12/2022 | Kobayashi | H04L 12/413 |
| 2023/0092180 | A1 * | 3/2023 | Tyne | G01R 31/343 |

* cited by examiner

SYSTEM AND METHOD FOR EXCHANGING DATA OR SIGNALS FOR VEHICLE

CROSS-REFERENCE TO RELATED APPLICATIONS

This application is a National Stage application under 35 U.S.C. § 371 of International Application No. PCT/KR2018/015825, filed on Dec. 13, 2018. The disclosure of the prior application is incorporated by reference in its entirety.

TECHNICAL FIELD

The present disclosure relates to a system and method for vehicle.

BACKGROUND ART

A vehicle is an apparatus that moves in a direction desired by a user who gets on. A typical example of the vehicle is a car. The vehicle contains a plurality of electronic devices. As an example of the electronic device contained in the vehicle, there is a user interface device for an interface with a user. The user checks information based on a signal received from an external device of vehicle or a signal generated from other electronic device inside the vehicle through the user interface device. Such a user interface device includes a plurality of hardware in order to implement various functions, and thus, a large number of lines are required for the power management, the synchronization signal, and the exchange of data signals between a plurality of hardware. Difficulty occurs during system manufacturing and A/S due to the complexity of many lines connected between a plurality of hardware.

DISCLOSURE

Technical Problem

In order to solve the above problems, an object of the present disclosure is to provide a vehicle system for exchanging data or signals by a minimum number of lines between a plurality of hardware provided in a vehicle.

In addition, an object of the present disclosure is to provide a method of exchanging data or signals by a minimum number of lines between a plurality of hardware provided in a vehicle.

The problems of the present disclosure are not limited to the problems mentioned above, and other problems that are not mentioned will be clearly understood by those skilled in the art from the following description.

Technical Solution

In order to achieve the above object, a vehicle system according to an embodiment of the present disclosure includes: a first electronic device configured to receive a radio frequency (RF) signal from an external device and process the RF signal to generate data; and a second electronic device configured to receive the data through an Ethernet communication method and perform an operation based on the data, wherein the first electronic device includes a first signal detector configured to receive a first wake-up signal in a power saving mode state; and a first Ethernet interface configured to attempt an Ethernet connection with the second electronic device when the first signal detector receives the first wakeup signal.

A method according to an embodiment of the present disclosure includes: receiving, by an antenna, an emergency message in a power saving mode state; generating, by a first processor, a first wake-up signal based on an emergency message; receiving, by a first signal detector, the first wake-up signal; and forming, by a first Ethernet interface, an Ethernet line with a second Ethernet interface.

The details of other embodiments are included in the detailed description and drawings.

Advantageous Effects

According to the present disclosure, there are one or more of the following effects.

First, there is an effect of overcoming a physical distance and reducing cost by implementing a single connection line between a plurality of devices with an Ethernet line.

Second, there is an effect of implementing a wake-up function at low power without data pattern recognition by using a signal detector.

Third, there is an effect of minimizing software change and replacing communication and control functions by changing hardware.

The effects of the present disclosure are not limited to the above-mentioned effects, and other effects that are not mentioned will be clearly understood by those skilled in the art from the description of the claims.

MODE FOR INVENTION

Figure 1:
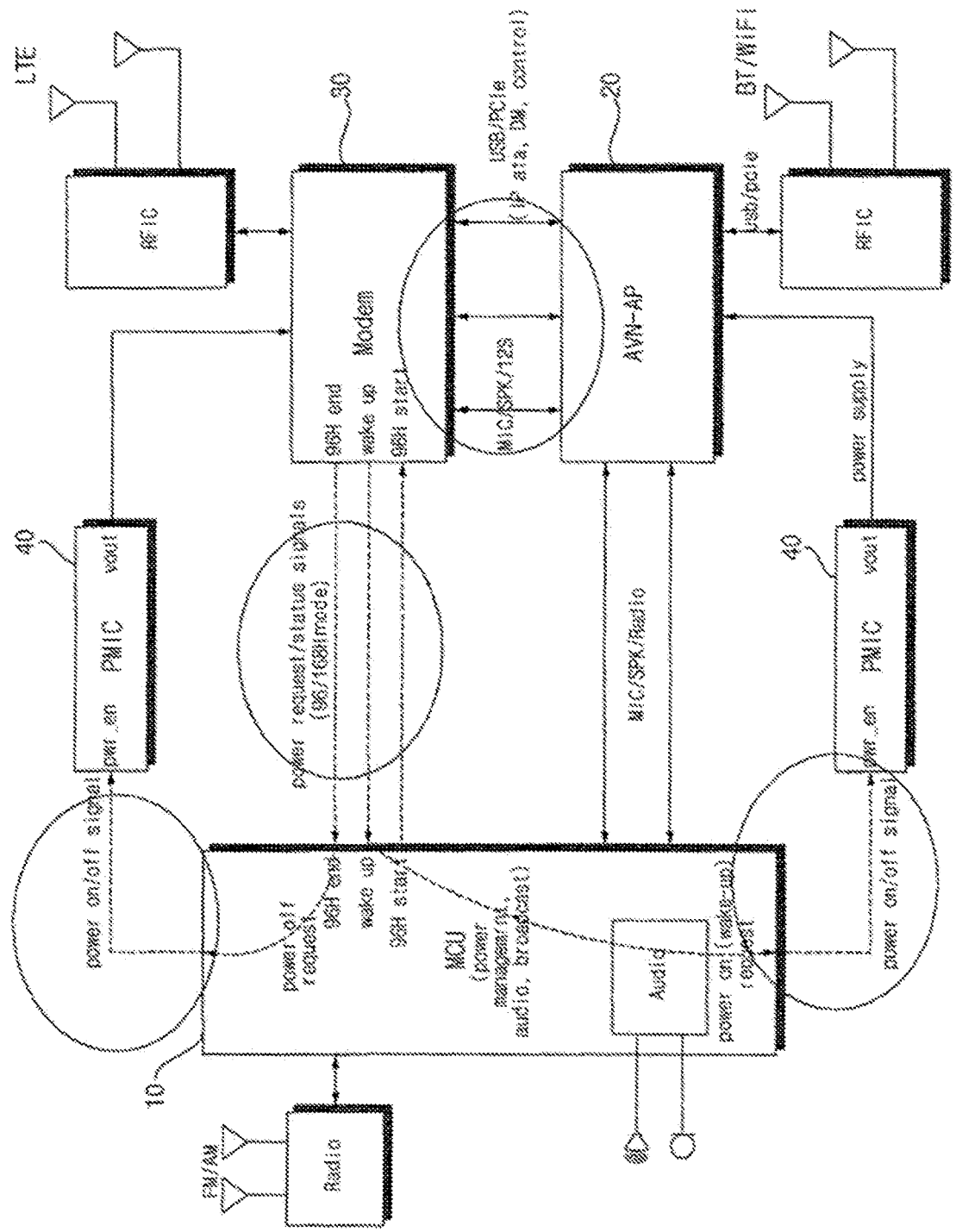
FIG. 1 is a view referred to for explaining an object and an effect of the present disclosure.

Description will now be given in detail according to exemplary embodiments disclosed herein, with reference to the accompanying drawings. For the sake of brief description with reference to the drawings, the same or equivalent components may be denoted by the same reference numbers, and description thereof will not be repeated. In general, suffixes such as "module" and "unit" may be used to refer to elements or components. Use of such suffixes herein is merely intended to facilitate description of the specification, and the suffixes do not have any special meaning or function. In the present disclosure, that which is well known to one of ordinary skill in the relevant art has generally been omitted for the sake of brevity. The accompanying drawings are used to assist in easy understanding of various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are only used to distinguish one element from another.

It will be understood that when an element (e.g., first element) is referred to as being "connected" or "coupled" to another element (e.g., second element), it can be directly connected or coupled to the other element (e.g., third element) or intervening elements may be present. In contrast, when an element (e.g., first element) is referred to as being "directly connected" or "directly coupled" to another element (e.g., second element), there are no intervening elements present.

A singular representation may include a plural representation unless context clearly indicates otherwise.

Terms such as "includes" or "has" used herein should be considered as indicating the presence of several components, functions or steps, disclosed in the specification, and it is also understood that more or fewer components, functions, or steps may likewise be utilized.

In the present application, it will be further understood that the terms "comprises", includes," etc. specify the presence of stated features, integers, steps, operations, elements, components, or combinations thereof, but do not preclude the presence or addition of one or more other features, integers, steps, operations, elements, components, or combinations thereof.

A vehicle described in this specification may be a concept including a car and a motorcycle. Hereinafter, vehicle is mainly described with respect to a car.

A vehicle described in this specification may be a concept including all of an internal combustion engine vehicle including an engine as a power source, a hybrid vehicle including an engine and an electric motor as a power source, and an electric vehicle including an electric motor as a power source.

In the following description, the left side of the vehicle means the left side in the traveling direction of the vehicle, and the right side of the vehicle means the right side in the traveling direction of the vehicle.

FIG. 1 is a view referred to for explaining an object and an effect of the present disclosure.

FIG. 1 illustrates a vehicle user interface device. Referring to FIG. 1, the vehicle user interface device may include a first processor 10, a second processor 20, a modem 30, and a power supply unit 40. In addition, the vehicle user interface device may include a plurality of communication devices. In the vehicle user interface device, signals must be exchanged between several included units. To this end, complex lines (circles drawn in the drawing) connecting each component of the vehicle interface device is required. As the number of components constituting the vehicle interface device increases, more lines are required. As the number of lines increases, more difficulties occur in manufacturing and A/S, and the production cost increases.

In the case where a communication device among the vehicle user interface device is configured with separate hardware, there is an advantage that the devices can be disposed in a position in the vehicle suitable for each role. For example, the communication device may be disposed around a loop in which the transmission/reception of RF signal can be accomplished smoothly, and a human machine interface (HMI) device may be disposed around a center fascia so that a user can check provided information while traveling. If the communication device and the HMI device are separated, the exchange of signals between these devices must be accomplished smoothly.

Meanwhile, the communication device must be activated with low power even when a vehicle 100 is turned off. According to an embodiment, if both the communication device and the HMI device must be activated, a wake-up signal should be easily provided from the communication device to the HMI device.

In the following description, a vehicle system capable of easily providing a wake-up signal from the communication device to the HMI device while simply configuring a line between the communication device and the HMI device will be described.

Figure 2:
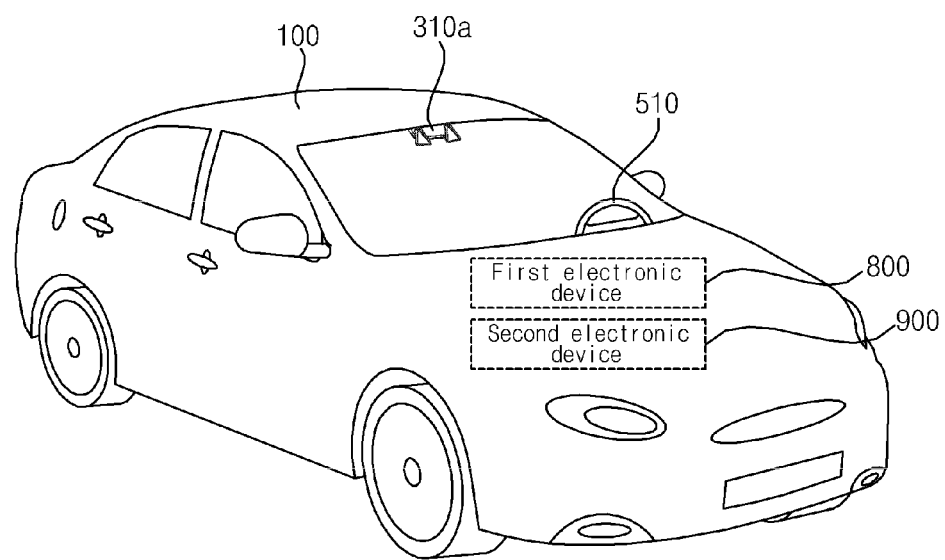
FIG. 2 is a view illustrating an outer shape of a vehicle according to an embodiment of the present disclosure.
Figure 2:
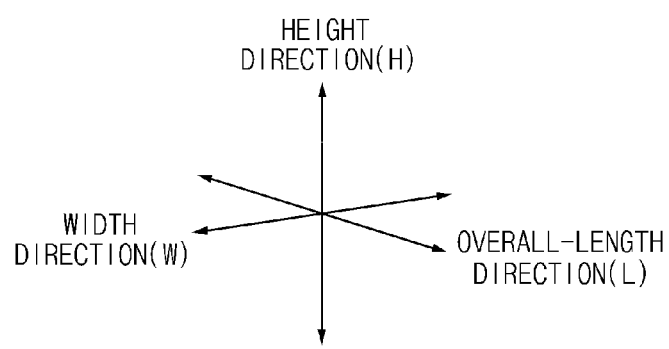

FIG. 2 is a view illustrating an outer shape of a vehicle according to an embodiment of the present disclosure.

Figure 3:
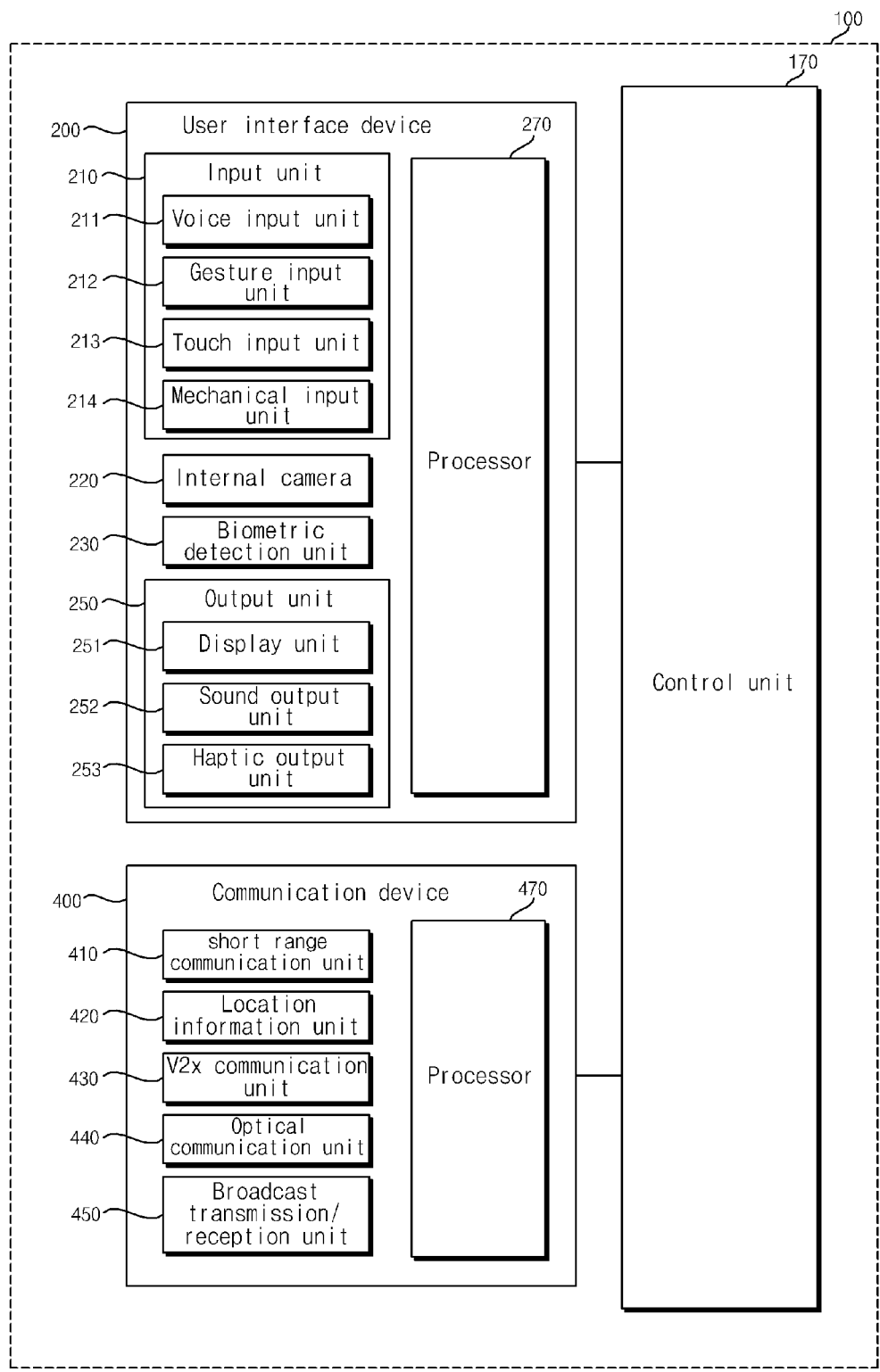
FIG. 3 is a block diagram referred to for explaining a vehicle according to an embodiment of the present disclosure.

FIG. 3 is a block diagram referred to for explaining a vehicle according to an embodiment of the present disclosure.

Referring to FIGS. 2 to 3, the vehicle 100 may include a wheel rotated by a power source and a steering input device 510 for adjusting a traveling direction of the vehicle 100.

The vehicle 100 may be an autonomous vehicle.

The vehicle 100 may be converted to an autonomous traveling mode or a manual mode based on a user input.

For example, the vehicle 100 may be converted from the manual mode to the autonomous traveling mode or may be converted from the autonomous traveling mode to the manual mode, based on a user input received through a user interface device 200.

The vehicle 100 may be converted to the autonomous traveling mode or the manual mode based on traveling situation information.

The traveling situation information may include at least one of object information outside the vehicle, navigation information, and vehicle state information.

For example, the vehicle 100 may be converted from the manual mode to the autonomous traveling mode or may be converted from the autonomous traveling mode to the manual mode, based on traveling situation information generated by an object detection device.

For example, the vehicle 100 may be converted from the manual mode to the autonomous traveling mode or may be converted from the autonomous traveling mode to the manual mode, based on traveling situation information received through a communication device 400.

The vehicle 100 may be converted from the manual mode to the autonomous traveling mode or may be converted from the autonomous traveling mode to the manual mode, based on information, data, and signals provided from an external device.

When the vehicle 100 is operated in the autonomous traveling mode, the autonomous vehicle 100 may be operated based on a traveling system.

When the vehicle 100 is operated in the manual mode, the autonomous vehicle 100 may receive a user input for traveling through a traveling operation device. The vehicle 100 may be operated based on the user input received through the traveling operation device.

An overall length may mean the length from the front part to the rear part of the vehicle 100, a width may mean the width of the vehicle 100, and a height may mean the length from the bottom of the wheel to the roof. In the following description, an overall length direction L may mean a direction that is a reference for measuring the overall length of the vehicle 100, a width direction W may mean a direction that is a reference for measuring the width of the vehicle 100, and a height direction H may mean a direction that is a reference for measuring the height of the vehicle 100.

As illustrated in FIG. 3, the vehicle 100 may include a user interface device 200, a communication device 400, and a control unit 170.

In some embodiments, the vehicle 100 may further include other constituent elements in addition to the constituent elements described in this specification, or may not include some of the described constituent elements.

The user interface device 200 is a device for the communication between the vehicle 100 and a user. The user interface device 200 may receive a user input and provide information generated in the vehicle 100 to the user. The vehicle 100 may implement User Interfaces (UI) or User Experience (UX) through the user interface device 200.

The user interface device 200 may include an input unit 210, an internal camera 220, a biometric detection unit 230, an output unit 250, and a processor 270.

In some embodiments, the user interface device 200 may further include other constituent elements in addition to the described constituent elements, or may not include some of the described constituent elements.

The input unit 210 is for receiving information from a user, and data collected by the input unit 210 may be analyzed by the processor 270 and processed as a control command of the user.

The input unit 210 may be disposed inside the vehicle. For example, the input unit 210 may be disposed in a region of a steering wheel, a region of an instrument panel, a region of a seat, a region of each pillar, a region of a door, a region of center console, a region of head lining, a region of sun visor, a region of windshield, a region of window, or the like.

The input unit 210 may include a voice input unit 211, a gesture input unit 212, a touch input unit 213, and a mechanical input unit 214.

The voice input unit 211 may convert user's voice input into an electrical signal. The converted electrical signal may be provided to the processor 270 or the control unit 170.

The voice input unit 211 may include one or more microphones.

The gesture input unit 212 may convert user's gesture input into an electrical signal. The converted electrical signal may be provided to the processor 270 or the control unit 170.

The gesture input unit 212 may include at least one of an infrared sensor and an image sensor for detecting user's gesture input.

According to an embodiment, the gesture input unit 212 may detect user's 3D gesture input. To this end, the gesture input unit 212 may include an optical output unit that outputs a plurality of infrared light or a plurality of image sensors.

The gesture input unit 212 may detect user's 3D gesture input through a time of flight (TOF) method, a structured light method, or a disparity method.

The touch input unit 213 may convert user's touch input into an electrical signal. The converted electrical signal may be provided to the processor 270 or the control unit 170.

The touch input unit 213 may include a touch sensor for sensing user's touch input.

According to an embodiment, the touch input unit 213 may be integrally formed with a display unit 251, thereby implementing a touch screen. Such a touch screen may provide an input interface between the vehicle 100 and a user and an output interface together.

The mechanical input unit 214 may include at least one of a button, a dome switch, a jog wheel, and a jog switch. The electrical signal generated by the mechanical input unit 214 may be provided to the processor 270 or the control unit 170.

The mechanical input unit 214 may be disposed in a steering wheel, a center fascia, a center console, a cock pit module, a door, or the like.

The internal camera 220 may acquire a vehicle inside image. The processor 270 may detect user's state based on the vehicle inside image. The processor 270 may acquire gaze information of user from the vehicle inside image. The processor 270 may detect user's gesture from the vehicle inside image.

The biometric detection unit 230 may acquire user's biometric information. The biometric detection unit 230 may include a sensor capable of acquiring user's biometric information, and may acquire user's fingerprint information, heart rate information, and the like by using the sensor. The biometric information may be used for user authentication.

The output unit 250 is for generating output related to the sense of touch, vision, hearing, and the like.

The output unit 250 may include at least one of the display unit 251, a sound output unit 252, and a haptic output unit 253.

The display unit 251 may display a graphic object corresponding to various information.

The display unit 251 may include at least one of a liquid crystal display (LCD), a thin film transistor-liquid crystal display (TFT LCD), an organic light-emitting diode (OLED), a flexible display, a 3D display, and an e-ink display.

The display unit 251 forms a mutual-layer structure with the touch input unit 213 or is integrally formed, thereby implementing a touch screen.

The display unit 251 may be implemented as a head up display (HUD). When the display unit 251 is implemented as a HUD, the display unit 251 may include a projection module to output information through an image projected to a windshield or a window.

The display unit 251 may include a transparent display. The transparent display may be attached to a windshield or a window.

The transparent display may display a certain screen while having a certain transparency. As for the transparent display, in order to have transparency, the transparent display may include at least one of a transparent thin film elecroluminescent (TFEL), a transparent organic light-emitting diode (OLED), a transparent liquid crystal display (LCD), a transmissive transparent display, and a transparent light emitting diode (LED) display. The transparency of the transparent display may be adjusted.

Meanwhile, the user interface device 200 may include a plurality of display units 251*a* to 251*g*.

The display unit 251 may be disposed in a region of a steering wheel, a region of an instrument panel 251*a*, 251*b*, 251*e*, a region of a seat 251*d*, a region of each pillar 251*f*, a region of a door 251*g*, a region of center console, a region of head lining, a region of sun visor, or may be implemented in a region of windshield 251*c*, or a region of window 251*h*.

The sound output unit 252 converts an electrical signal provided from the processor 270 or the control unit 170 into an audio signal and outputs it. To this end, the sound output unit 252 may include one or more speakers.

The haptic output unit 253 generates a tactile output. For example, the haptic output unit 253 may vibrate the steering wheel, seat belt, and seats 110FL, 110FR, 110RL, and 110RR so that a user can recognize the output.

The processor 270 may control the overall operation of each unit of the user interface device 200.

According to an embodiment, the user interface device 200 may include a plurality of processors 270 or may not include the processors 270.

When the processor 270 is not included in the user interface device 200, the user interface device 200 may be operated according to the control of the processor or the control unit 170 of other device in the vehicle 100.

Meanwhile, the user interface device 200 may be referred to as a vehicle display device.

The user interface device 200 may be operated under the control of the control unit 170.

The communication device 400 is a device for performing communication with an external device. Here, the external device may be other vehicle, mobile terminal, or server.

The communication device 400 may include at least one of a transmission antenna, a reception antenna, a radio frequency RF circuit capable of implementing various communication protocols, and an RF element to perform communication.

The communication device 400 may include a short range communication unit 410, a location information unit 420, a V2X communication unit 430, an optical communication unit 440, a broadcast transmission/reception unit 450, an intelligent transport systems (ITS) communication unit 460, and a processor 470.

In some embodiments, the communication device 400 may further include other constituent elements in addition to the described constituent elements, or may not include some of the described constituent elements.

The short range communication unit 410 is a unit for short range communication. The short range communication unit 410 may support a short range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies.

The short range communication unit 410 may form a short-range wireless communication network (Wireless Area Networks) to perform short-range communication between the vehicle 100 and at least one external device.

The location information unit 420 is a unit for acquiring location information of the vehicle 100. For example, the location information unit 420 may include a Global Positioning System (GPS) module or a Differential Global Positioning System (DGPS) module.

The V2X communication unit 430 is a unit for performing wireless communication with a server (Vehicle to Infra: V2I), other vehicle (Vehicle to Vehicle: V2V), or a pedestrian (Vehicle to Pedestrian: V2P). The V2X communication unit 430 may include an RF circuit capable of implementing protocols of communication with infrastructure (V2I), vehicle-to-vehicle communication (V2V), and communication with pedestrians (V2P).

The optical communication unit 440 is a unit for performing communication with an external device through light. The optical communication unit 440 may include an optical transmitter that converts an electrical signal into an optical signal and transmits it to the outside, and an optical receiver that converts a received optical signal into an electrical signal.

According to an embodiment, the optical transmitter may be formed integrally with a lamp included in the vehicle 100.

The broadcast transmission/reception unit 450 is a unit for receiving a broadcast signal from an external broadcast management server or transmitting a broadcast signal to a broadcast management server through a broadcast channel. Broadcast channel may include satellite channel and terrestrial channel. The broadcast signal may include a TV broadcast signal, a radio broadcast signal, and a data broadcast signal.

The ITS communication unit 460 may exchange information, data, or signals with a transportation system. The ITS communication unit 460 may provide the acquired information and data to the transportation system. The ITS communication unit 460 may receive information, data, or signals from the transportation system. For example, the ITS communication unit 460 may receive road traffic information from a traffic system and provide it to the control unit 170. For example, the ITS communication unit 460 may receive a control signal from the transportation system and provide it to the control unit 170 or to a processor provided inside the vehicle 100.

The processor 470 may control the overall operation of each unit of the communication device 400.

According to an embodiment, the communication device 400 may include a plurality of processors 470 or may not include the processors 470.

When the processor 470 is not included in the communication device 400, the communication device 400 may be operated under the control of the processor or the control unit 170 of other device in the vehicle 100.

Meanwhile, the communication device 400 may implement a vehicle display device together with the user interface device 200. In this case, the vehicle display device may be referred to as a telematics device or an audio video navigation (AVN) device.

The communication device 400 may be operated under the control of the control unit 170.

One or more processors and the control unit 170 included in the vehicle 100 may be implemented by using at least one of application specific integrated circuits (ASICs), digital signal processors (DSPs), digital signal processing devices (DSPDs), programmable logic devices (PLDs), and field programmable gate arrays (FPGAs), processors, controllers, micro-controllers, microprocessors, and electrical units for performing other functions.

According to an embodiment, the vehicle 100 may further include an object detection device, a traveling operation device, a vehicle driving device, a traveling system, a sensing unit, and the like.

The object detection device may detect an object outside the vehicle 100. The object detection device may include at least one of a camera, a radar, a lidar, an ultrasonic sensor, and an infrared sensor. The object detection device may provide data related to an object generated based on a sensing signal generated by a sensor to at least one electronic device included in the vehicle.

The traveling operation device is a device that receives a user input for traveling. In the case of a manual mode, the vehicle 100 may travel based on a signal provided by the traveling operation device. The traveling operation device may include a steering input device (e.g. a steering wheel), an acceleration input device (e.g. an acceleration pedal), and a brake input device (e.g. a brake pedal).

The vehicle driving device is a device that electrically controls driving of various devices in the vehicle 100. The vehicle driving device may include a power train driving unit, a chassis driving unit, a door/window driving unit, a safety device driving unit, a lamp driving unit, and an air conditioning driving unit. The power train driving unit may include a power source driving unit and a transmission driving unit. The chassis driving unit may include a steering driving unit, a brake driving unit, and a suspension driving unit.

The traveling system may perform a traveling operation of the vehicle 100. The traveling system may move the vehicle 100 by providing a control signal to at least one of the power train driving unit and the chassis driving unit among the vehicle driving device.

The traveling system may include at least one of an ADAS application and an autonomous traveling application. The traveling system may generate a traveling control signal by at least one of an ADAS application and an autonomous traveling application.

The sensing unit may sense the state of the vehicle. The sensing unit may include at least one of an inertial navigation unit (IMU) sensor, a collision sensor, a wheel sensor, a speed sensor, a tilt sensor, a weight detection sensor, a heading sensor, a position module, a vehicle forward/reverse sensor, a battery sensor, a fuel sensor, a tire sensor, a sensor of steering due to steering wheel rotation, a vehicle inside temperature sensor, a vehicle inside humidity sensor, an ultrasonic sensor, an illuminance sensor, an acceleration pedal position sensor, and a brake pedal position sensor. Meanwhile, the inertial navigation unit (IMU) sensor may include one or more of an acceleration sensor, a gyro sensor, and a magnetic sensor.

The sensing unit may generate state data of the vehicle, based on a signal generated by at least one sensor. The sensing unit may acquire vehicle posture information, vehicle motion information, vehicle yaw information, vehicle roll information, vehicle pitch information, vehicle collision information, vehicle direction information, vehicle angle information, vehicle speed information, vehicle acceleration information, vehicle tilt information, vehicle forward/reverse information, battery information, fuel information, tire information, vehicle lamp information, vehicle inside temperature information, vehicle inside humidity information, and a sensing signal related to a steering wheel rotation angle, a vehicle outside illuminance, a pressure applied to the acceleration pedal, a pressure applied to the brake pedal, and the like.

In addition, the sensing unit may further include an acceleration pedal sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS), and the like.

The sensing unit may generate vehicle state information, based on the sensing data. The vehicle state information may be information generated based on data detected by various sensors provided inside the vehicle.

For example, the vehicle state information may include vehicle posture information, vehicle speed information, vehicle tilt information, vehicle weight information, vehicle direction information, vehicle battery information, vehicle fuel information, vehicle tire pressure information, vehicle steering information, vehicle inside temperature information, vehicle inside humidity information, pedal position information, vehicle engine temperature information, and the like.

The vehicle 100 may include an internal communication system. A plurality of electronic devices included in the vehicle 100 may exchange signals through an internal communication system. The signals may contain data. The internal communication system may use at least one communication protocol (e.g. CAN, LIN, FlexRay, MOST, Ethernet).

Figure 4:
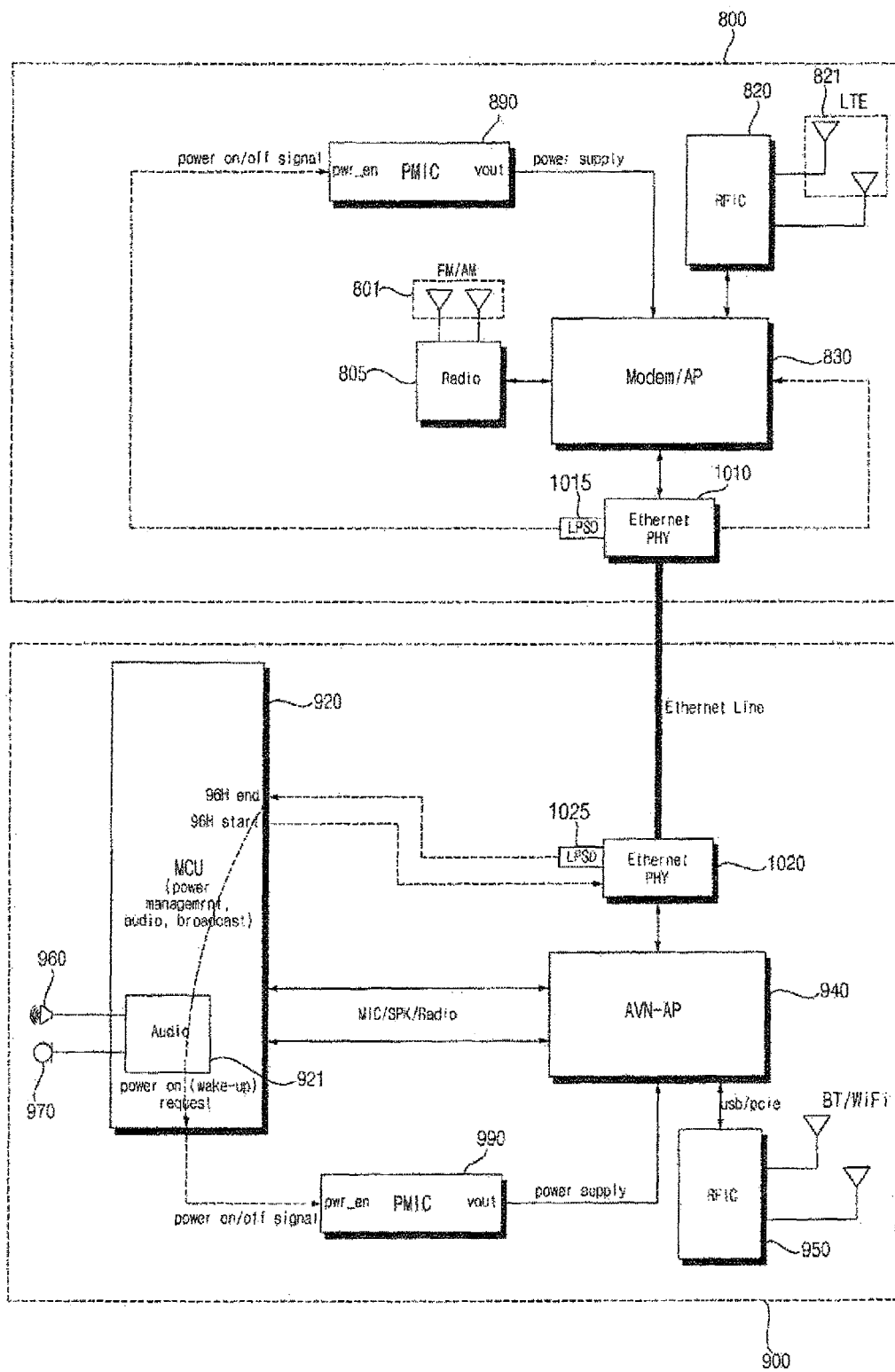
FIGS. 4 to 8 are views referred to for explaining a system according to an embodiment of the present disclosure.

FIG. 4 is a block diagram of a system according to an embodiment of the present disclosure.

Referring to FIG. 4, the vehicle 100 may include a vehicle system 1. The vehicle system 1 may include a first electronic device 800 that communicates with an external device through a radio frequency (RF) signal, and a second electronic device 900 that provides an interface for a user. The first electronic device 800 may be referred to as a communication device. The second electronic device 900 may be referred to as a human machine interface (HMI) device.

The first electronic device 800 and the second electronic device 900 may exchange data or signals through Ethernet communication. The first electronic device 800 and the second electronic device 900 may include Ethernet interfaces 1010 and 1020, respectively.

The first electronic device 800 may receive an RF signal from an external device and may process the received RF signal to generate data. The first electronic device 800 may transmit an RF signal to the external device.

The first electronic device 800 may include a first communication unit 805, a second communication unit 820, a first processor 830, a power supply unit 890, a first Ethernet interface 1010, and a first signal detector 1015.

The first communication unit 805 is a unit for receiving a broadcast signal from an external broadcast management server or transmitting a broadcast signal to the broadcast management server through a broadcast channel. The broadcast channel may include a satellite channel and a terrestrial channel. The broadcast signal may include a TV broadcast signal, a radio broadcast signal, and a data broadcast signal. The first communication unit 805 may be classified as a sub configuration of the first electronic device 800, while performing the function of the broadcast transmission/reception unit 450 of FIG. 7.

The first communication unit 805 may receive a broadcast signal transmitted from a broadcasting station. The first communication unit 805 may include a first antenna 801 for receiving a broadcast signal. For example, the first antenna 801 may include an AM broadcast antenna, an FM broadcast antenna, and/or a DMB broadcast antenna. The first communication unit 805 may include at least one of a radio frequency (RF) circuit and an RF element for performing communication with the broadcast management server.

The second communication unit 820 may communicate with at least one of other vehicle and a traffic management server. The second communication unit 820 may include a second antenna 821 for receiving a signal related to traveling situation information. Meanwhile, the second communication unit 820 may be classified as a sub configuration of the second electronic device 900, while performing the function of the V2X communication unit 430 and the ITS communication unit 460 of FIG. 7.

Meanwhile, at least one of the first antenna 801 and the second antenna 821 may receive an emergency message in a power saving mode state of the first electronic device 800.

The first processor 830 may generate data by processing an RF signal. The first processor 830 may serve as a modem that processes a signal received from at least one of the first communication unit 805 and the second communication unit 820. The first processor 830 may serve as an application processor (AP) related to broadcasting or traveling situation information. According to an embodiment, the first processor 830 may be separated in software or hardware into a processor that serves as a modem and a processor that serves as an application processor.

The first processor 830 may generate data by processing a broadcast signal. The first processor 830 may generate data in an Ethernet communication format by processing a broadcast signal. The data may be data related to broadcast (e.g. radio broadcast, TV broadcast, data broadcast) content.

The first processor 830 may generate data by processing a signal related to traveling situation information. The first processor 830 may generate data in an Ethernet communication format by processing a signal related to traveling situation information. The data may be data related to traveling of the vehicle 100. For example, the data may be data related to traveling situation information (e.g. object information, navigation information, vehicle state information) of other vehicle generated in other vehicle.

The first processor 830 may generate a first wakeup signal based on an emergency message received through at least one of the first antenna 801 and the second antenna 821.

The power supply unit 890 may receive power from a battery inside the vehicle 100 and supply power to each unit of the first electronic device 800. The power supply unit 890 may supply power to the first processor 830 according to a signal generated by the first signal detector. For example, in the power saving mode state, when the first signal detector receives a first wake-up signal, the first signal detector may provide a signal to the power supply unit 890. In this case, the power supply unit 890 may supply power to the first processor 830.

A first signal detector 1015 may receive a first wake up signal in a power saving mode state. In the power saving mode state of the first electronic device 800, the first processor 830 may receive an RF signal for activating a system through at least one of the first communication unit 805 and the second communication unit 820. When receiving the RF signal, the first processor 830 may generate a first wake-up signal. The first signal detector 1015 may receive a first wake-up signal.

The first Ethernet interface 1010 may transmit and receive data or a signal in an Ethernet format. The first Ethernet interface 1010 may transmit data or a signal to the second electronic device 900. The first Ethernet interface 1010 may receive data or a signal from the second electronic device 900. The first Ethernet interface 1010 may form an Ethernet line with the second Ethernet interface 1020 of the second electronic device 900.

When the first signal detector 1015 receives the first wakeup signal, the first Ethernet interface 1010 may attempt an Ethernet connection with the second electronic device 900.

The first electronic device 800 may include at least one printed circuit board (PCB). On the printed circuit board of the first electronic device 800, the first communication unit 805, the second communication unit 820, the first processor 830, the power supply unit 890, the first Ethernet interface 1010, and the first signal detector 1015 is mounted to configure hardware independent from the second electronic device 900.

The second electronic device 900 may receive data from the first electronic device 800 through an Ethernet communication method and perform an operation based on the data. For example, the second electronic device 900 may receive data from the first electronic device 800 through an Ethernet communication method and output content based on the data. The second electronic device 900 may output at least one of visual content, auditory content, and tactile content, based on data received from the first electronic device 800.

The second electronic device 900 may include a second processor 920, a third processor 940, a speaker 960, a microphone 970, a short-range communication unit 950, a power supply unit 990, a second Ethernet interface 1020, and a second signal detector 1025.

The second processor 920 may perform power management and content output control operation. The second processor 920 may receive data from the first processor 810 of the first electronic device 800 through an Ethernet communication method. The second processor 920 may exchange signals with the third processor 940.

Meanwhile, the second processor 920 may include the audio signal processing unit 921. The audio signal processing unit 921 may control the speaker 960 so that the electrical signal generated by the second processor 920 is converted into a sound signal and output. The audio signal processing unit 921 may control the microphone 970 to convert a received sound signal into an electrical signal.

The second processor 920 may be booted up when the second signal detector 1025 receives a second wakeup signal in a power down state of the second electronic device 900.

The second processor 920 may transmit a wake-up state message of the second processor 920 to the first processor 830 through an Ethernet communication method in a state where the second processor 920 is booted up. The wakeup state message of the second processor 920 may be transmitted to the first processor 830 through the second Ethernet interface 1020 and the first Ethernet interface 1010.

In the booted state, the second processor 920 may receive data from the first processor 830 through an Ethernet communication method, and output content based on the data.

The third processor 940 may serve as an autid video navigation application processor (AVN-AP). The third processor 940 may exchange signals with the second processor 920. The third processor 940 may exchange data or signals with a user mobile terminal through the short-range communication unit 950.

The third processor 940 may be booted up when the second signal detector 1025 receives a second wakeup signal in a power down state of the second electronic device 900.

The third processor 940 may transmit a wake-up state message of the third processor 940 to the first processor 830 through the Ethernet communication method in a state where the third processor 940 is booted up.

Meanwhile, according to an embodiment, the second processor 920 and the third processor 940 may be integrally formed. A processor formed integrally while performing the functions of both the second processor 920 and the third processor 940 described above may be referred to as a second processor for convenience.

The speaker 960 may convert an electrical signal into a sound signal. The speaker 960 may output sound based on an electrical signal generated by the second processor 920. The speaker 960 may output content based on an electrical signal generated by the second processor 920.

The microphone 970 may convert a sound signal into an electrical signal. The microphone 970 may transmit the converted electrical signal to the second processor 920.

The short-range communication unit 950 may perform short-range communication with a mobile terminal possessed by a user. For example, the short-range communication unit 950 may perform short-range communication with a mobile terminal through Bluetooth or Wi-Fi. The data received through the short-range communication unit 950 may be provided to the third processor 940. The data generated or processed by the third processor 940 may be provided to the mobile terminal through the short-range communication unit 950. The description of the short-range communication unit 410 of FIG. 7 may be applied to the short-range communication unit 950. The short-range communication unit 950 may be connected to the third processor 940 through a Universal Serial Bus (USB) or a Peripheral Component Interconnect Express (PCIe).

The power supply unit 990 may receive power from a battery inside the vehicle 100 and supply power to each unit of the second electronic device 900, under control of the second processor 920. The power supply unit 990 may supply power to the third processor 940 according to a power control signal generated by the second processor 920.

The second signal detector 1025 may receive a second wakeup signal from the first electronic device 800 in a power down state. In the power down state of the second electronic device 200, the second signal detector 1025 may receive a second wakeup signal from the first electronic device 800 through an Ethernet communication line. When the second wakeup signal is received, the second signal detector 1025 may transmit a signal to the second processor 920 to boot the second processor 920 up.

The second Ethernet interface 1020 may transmit and receive data or signals in an Ethernet format. The second Ethernet interface 1020 may transmit data or signals to the first electronic device 800. The second Ethernet interface 1020 may receive data or signals from the first electronic device 800. The second Ethernet interface 1020 may form an Ethernet line with the first Ethernet interface 1010 of the first electronic device 800.

The second electronic device 900 may further include a display unit. The display unit may output a screen based on the electrical signal generated by the second processor 920. The description of the display unit 251 of FIG. 7 may be applied to the display unit.

The second electronic device 900 may include at least one printed circuit board (PCB). The second processor 920, the speaker 960, the microphone 970, the third processor 940, the short-range communication unit 950, and the power supply unit 990 may be mounted on the printed circuit board of the second electronic device 900, thereby configuring hardware independent from the first electronic device 800.

Figure 5:
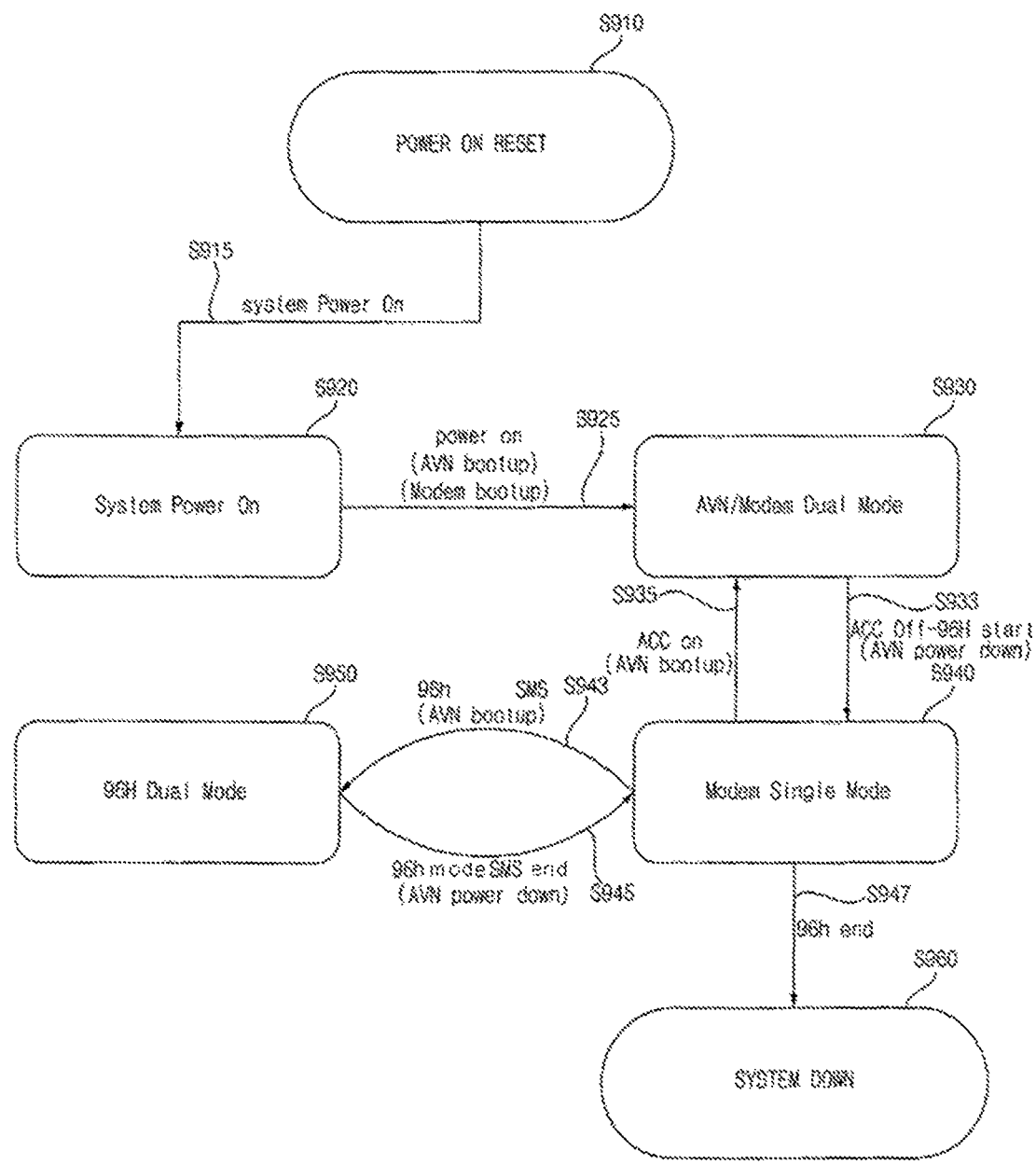

FIG. 5 is a transition diagram of a system according to an embodiment of the present disclosure.

Referring to FIG. 5, when an accessory (ACC) of the vehicle 100 is turned on, a power on reset is accomplished in a system 1 (S910). Power is supplied to the system 1 (S915), and the system 1 enters a power on state (S920). When the system 1 enters the power on state, both the first electronic device 800 and the second electronic device 900 are booted up (S925), and the system 1 enters a dual mode state (S930). The dual mode may be described as a mode in which the first electronic device 800 and the second electronic device 900 operate in a normal state.

When the ACC of the vehicle 100 is turned off (S933), the system 1 may be converted to a single mode (S940). In the single mode, the first electronic device 800 may be in a power saving mode state, and the second electronic device 900 may be described as a power down state. The power saving mode state of the first electronic device 800 may be defined as a low power operating state in which only a specific RF signal reception operation is accomplished. The power down state of the second electronic device 900 may be defined as a state in which the power for the second electronic device 900 is blocked. When the ACC of the vehicle 100 is turned on (S935), the system 1 enters the dual mode state (S930).

Meanwhile, in the single mode state of the system 1, when an emergency message is received in the first electronic device 800 (S943), the system 1 may be converted to a temporary dual mode (S950). The temporary dual mode may be defined as a state in which the first electronic device 800 and the second electronic device 900 wake up to process an emergency message when the emergency message is received. In the temporary dual mode state of the system 1, when the emergency message is processed (S945), the system 1 may be converted to the single mode (S940).

Meanwhile, in the single mode state of the system 1, when a preset time elapses, the system 1 goes down (S960). In the system 1 down state, power is not supplied to the system 1, and the system 1 performs no operation.

Figure 6:
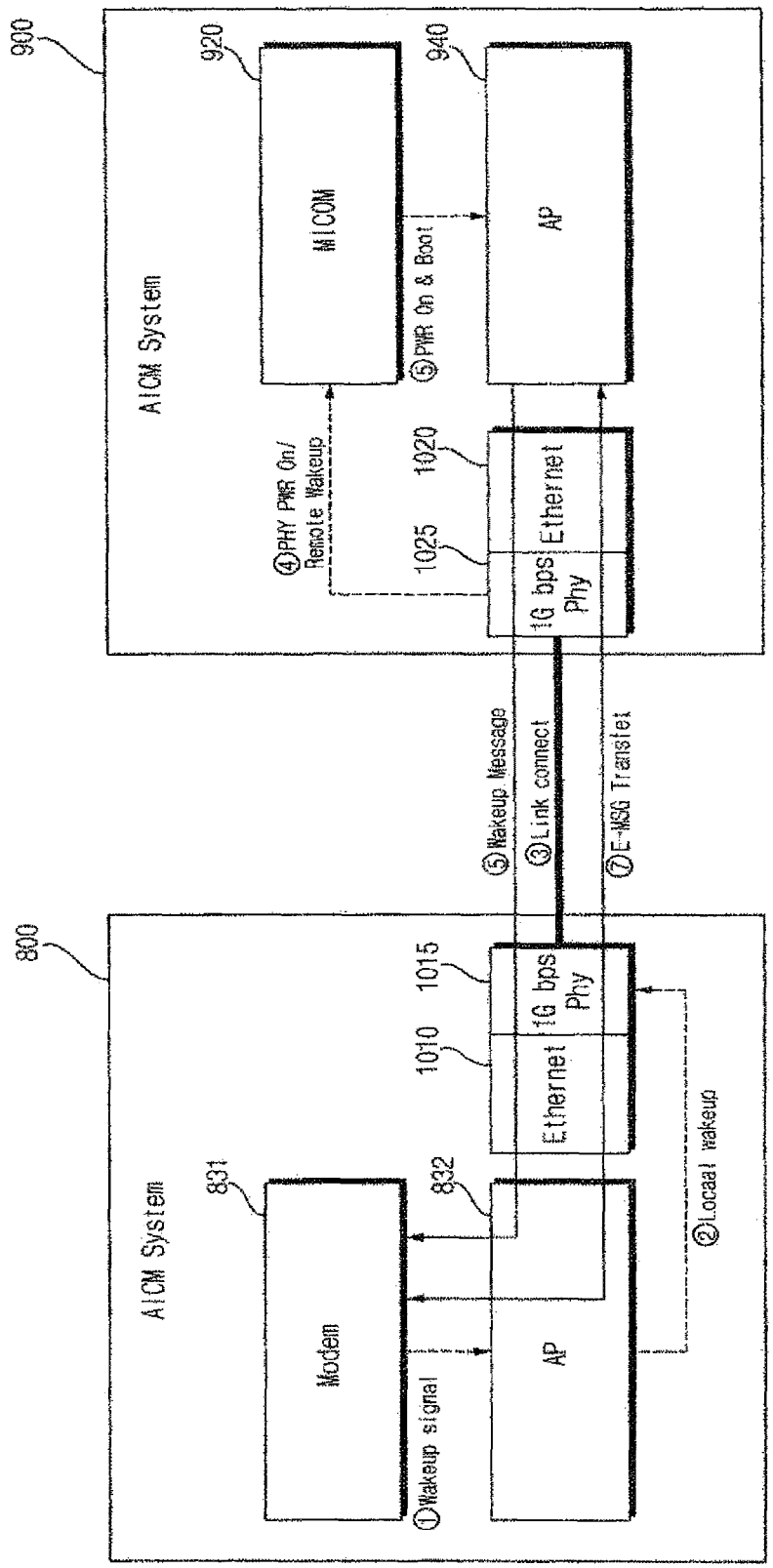
Figure 7:
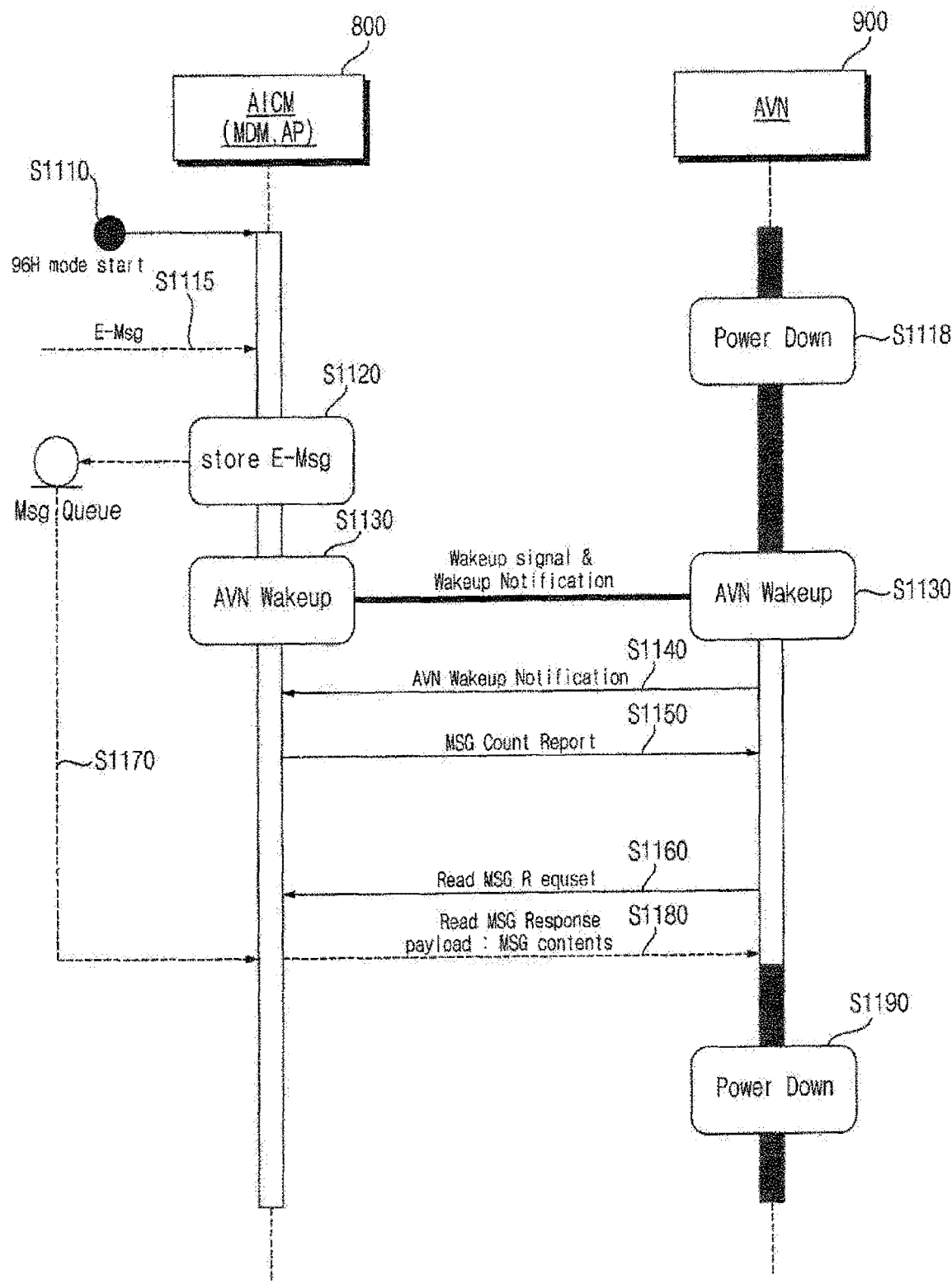

FIGS. 6 and 7 are views referred to for explaining an Ethernet communication method between the first electronic device and the second electronic device according to an embodiment of the present disclosure.

Referring to FIGS. 6 and 7, when the ACC of the vehicle 100 is turned off and the system 1 is converted to the single mode, the first electronic device 800 enters the power saving mode (S1110). When the first electronic device 800 is in a power saving mode state, at least one of the first antenna 801 and the second antenna 821 may receive an emergency message (S1115).

The first processor 830 may store an emergency message (S1120). Next, the system 1 may be converted to the temporary dual mode. When the system 1 is converted to the temporary dual mode, the first electronic device 800 and the second electronic device 900 may wake up.

The operation of switching to the temporary dual mode of the system 1 is as follows.

Referring to FIG. 6, the first processor 830 may be separated into a modem 831 and an application processor 832 in software or hardware. FIG. 6 illustrates the first processor 830 separated into the modem 831 and the application processor 832, but in the following description, both the modem 831 and the application processor 832 will be referred to as the first processor 830.

The first processor 830 may generate a first wake-up signal based on the emergency message. The first processor 830 may wake up (referred to as a local wakeup) the first electronic device 800 based on the first wakeup signal. The first signal detector 1015 may receive a first wakeup signal from the first processor 830. When the first signal detector 1015 receives the first wake up signal, the first Ethernet interface 1010 may form an Ethernet line with the second Ethernet interface 1020.

When an Ethernet line is formed, the second signal detector 1025 may receive a second wakeup signal from the first processor 830 through the Ethernet line. When the second signal detector 1025 receives the second wakeup signal, the second processor 920 may be booted up by receiving power from the power supply unit 990 in a power down state.

Through this process, the system 1 is converted to the temporary dual mode, and the second electronic device 900 wakes up.

The operation of the system 1 in the temporary dual mode state is as follows.

Referring to FIG. 7, through the above-described process, the second electronic device 900 wakes up (S1130). In the booted state, the second processor 920 may transmit a wake-up state message to the first processor 830 through an Ethernet line (S1140). According to an embodiment, the third processor 940 may transmit a wakeup state message to the first processor 830.

The first processor 830 may report a message count to the second processor 920 or the third processor 940 through an Ethernet line (S1150). The second processor 920 or the third processor 940 may transmit a read message request signal to the first processor 830 through an Ethernet line (S1150).

When a request signal is received from the second processor 920 or the third processor 940, the first processor 830 calls a stored emergency message (S1170), and may transmit data based on the emergency message to the second processor 920 or the third processor 940 (S1180).

In the booted state, the second processor 920 may receive data from the first processor 830 through an Ethernet line (S1180), and perform an operation based on the data.

In a booted state, the third processor 940 may receive data from the first processor 830 through an Ethernet line (S1180), and perform an operation based on the data.

After the operation is completed, in a state where the system 1 enters the single mode again, the first electronic device 800 may be converted to the power saving mode, and the second electronic device 900 may be power down (S1190).

Figure 8:
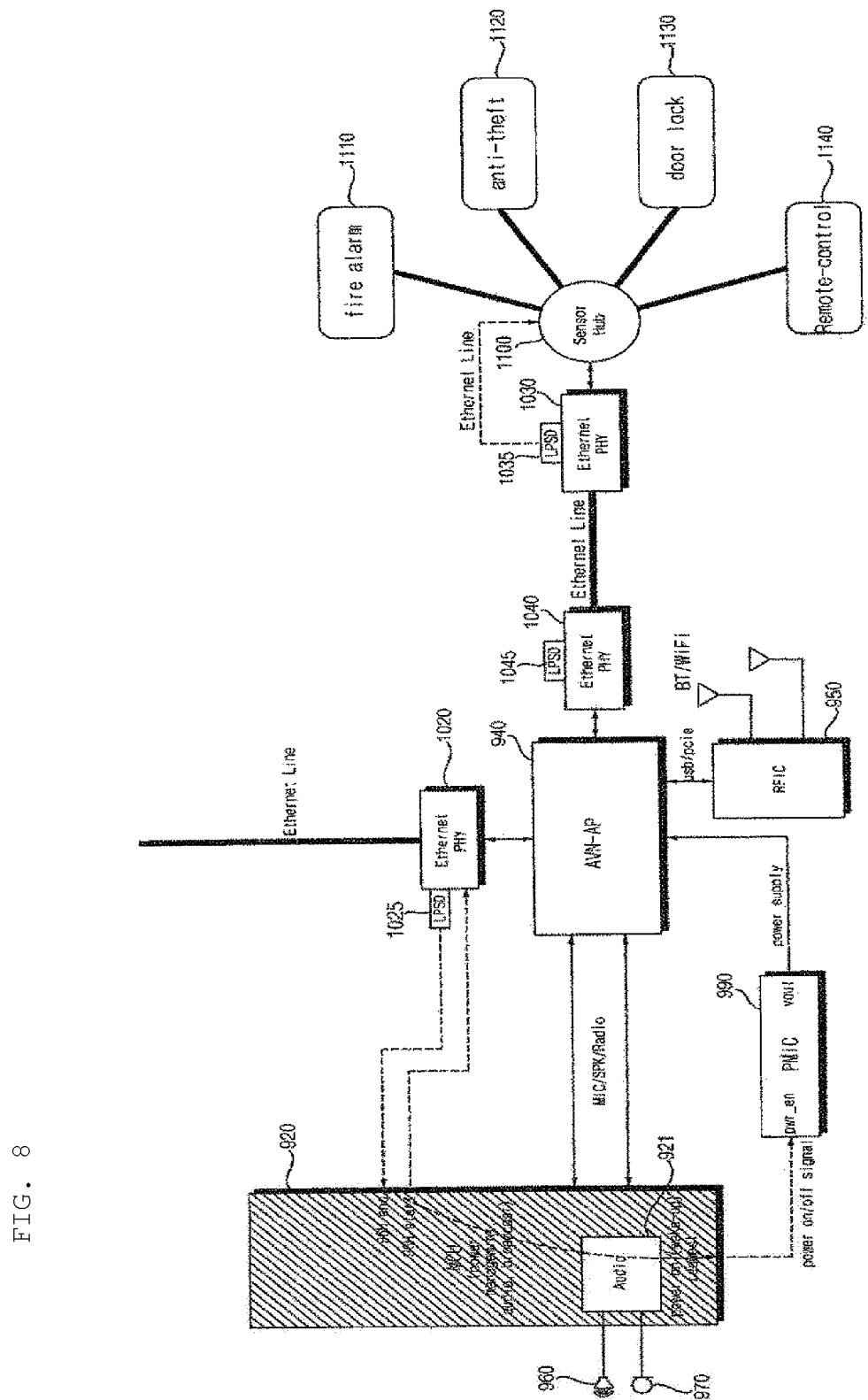

FIG. 8 is a block diagram of a system according to an embodiment of the present disclosure.

Referring to FIG. 8, the system 1 may further include a sensor hub 1100 and a third Ethernet interface 1030.

The sensor hub 1100 may exchange data with a plurality of sensors 1110, 1120, 1130, and 1140 through a CAN communication. The third Ethernet interface 1030 may be connected to the sensor hub 1100 to form an Ethernet line with the second electronic device 900. In this case, the second electronic device 900 may receive data generated by at least one of the plurality of sensors 1110, 1120, 1130, and 1140 from the sensor hub 1100 through an Ethernet communication method.

Meanwhile, the system 10 may further include a third signal detector 1035. The third signal detector 1035 may receive a third wakeup signal from the second electronic device 900 in a power down state of the sensor hub 1110. In the power down state of the sensor hub 1110, the third signal detector 1035 may receive a third wakeup signal from the second electronic device 900 through an Ethernet communication line. When the third wakeup signal is received, the third signal detector 1035 may transmit a signal to the sensor hub 1110 to boot the sensor hub 1110 up.

The third Ethernet interface 1030 may transmit and receive data or signals in an Ethernet format. The third Ethernet interface 1030 may transmit data or signals to the second electronic device 900. The third Ethernet interface 1030 may receive data or signals from the second electronic device 900. The third Ethernet interface 1030 may form an Ethernet line with the second Ethernet interface 1020 of the second electronic device 900.

Meanwhile, according to an embodiment, the second electronic device 900 may further include a fourth Ethernet interface 1040 and a fourth signal detector 1045. The third Ethernet interface 1030 may form an Ethernet line with the fourth Ethernet interface 1040. The third signal detector 1035 may receive a third wakeup signal from the fourth signal detector 1045.

Meanwhile, in the Ethernet communication method described with reference to FIGS. 6 and 7, the second processor 920 may further include a step of forming an Ethernet line with a sensor hub 1110 exchanging data through CAN communication with a plurality of sensors 1110, 1120, 1130, and 1140, and a step of receiving, by the second processor 920, data generated by at least one of the plurality of sensors 1110, 1120, 1130, and 1140 through an Ethernet communication method from the sensor hub. Meanwhile, the step of forming an Ethernet line with the sensor hub 1110 and the step of receiving data from the sensor hub 1110 may be accomplished in a state in which the system 1 is in a dual mode.

The present disclosure described above can be implemented as a computer-readable code on a medium on which a program is recorded. The computer-readable medium includes all types of recording devices that store data that can be read by a computer system. Examples of computer-readable media include hard disk drive (HDD), solid state disk (SSD), silicon disk drive (SDD), ROM, RAM, CD-ROM, magnetic tape, floppy disk, optical data storage device, optical data storage device, and the like, and also includes implementations in the form of a carrier wave (e.g. transmission over the Internet). In addition, the computer may include a processor or a control unit. Therefore, the above mentioned detailed description should not be construed as restrictive in all respects and should be considered as illustrative. The scope of the present disclosure should be determined by reasonable interpretation of the appended claims, and all changes within the equivalent scope of the present disclosure are included in the scope of the present disclosure.

EXPLANATION OF REFERENCE NUMERAL

1: system
100: vehicle
800: first electronic device
830: first processor
900: second electronic device
920: second processor

The invention claimed is:

1. A vehicle system comprising:
a first electronic device configured to receive a radio frequency (RF) signal from an external device and process the RF signal to generate data; and
a second electronic device configured to receive the data through an Ethernet communication method and perform an operation based on the data,
wherein the first electronic device comprises:
an antenna configured to, when the first electronic device is operating in a power saving mode state and the second electronic device is operating in a power down state, receive an emergency message, the power saving mode state being a state in which only a specific RF signal reception operation is performed, and the power down state being a state in which power for the second electronic device is blocked, and
a first processor configured to generate a first wake-up signal based on the emergency message,
a first signal detector configured to receive the first wake-up signal in the power saving mode state, and
a first Ethernet interface configured to, based on the first signal detector receiving the first wake-up signal, attempt an Ethernet connection with the second electronic device.

2. The vehicle system of claim 1, wherein the second electronic device comprises:
a second Ethernet interface configured to form an Ethernet line with the first Ethernet interface; and
a second signal detector configured to receive a second wake-up signal from the first electronic device.

3. The vehicle system of claim 2, wherein the second electronic device further comprises a second processor configured to, based on the second signal detector receiving the second wake up signal in the power down state, enter a booted state.

4. The vehicle system of claim 3, wherein the second processor is configured to transmit a wake-up state message to the first processor through the Ethernet communication method, in the booted state.

5. The vehicle system of claim 3, wherein the second processor is configured to receive the data through the Ethernet communication method and output content based on the data, in the booted state.

6. The vehicle system of claim 1, further comprising:
   a sensor hub configured to exchange data through a controller area network (CAN) communication with a plurality of sensors; and
   a third Ethernet interface configured to be connected to the sensor hub and form an Ethernet line with the second electronic device.

7. The vehicle system of claim 6, wherein the second electronic device receives data generated by at least one of the plurality of sensors from the sensor hub through an Ethernet communication method.

8. A method comprising:
   receiving, by an antenna of a first electronic device operating in a power saving mode state when a second electronic device is operating in a power down state, an emergency message, the power saving mode state being a state in which only a specific RF signal reception operation is performed, and the power down state being a state in which power for the second electronic device is blocked;
   generating, by a first processor of the first electronic device, a first wake-up signal based on the emergency message;
   receiving, by a first signal detector of the first electronic device, the first wake-up signal; and
   forming, by a first Ethernet interface of the first electronic device, an Ethernet line with a second Ethernet interface of the second electronic device.

9. The method of claim 8, further comprising:
   receiving, by a second signal detector of the second electronic device, a second wake-up signal received through the Ethernet line; and
   receiving, by a second processor of the second electronic device, power in a power down state to enter a booted state.

10. The method of claim 9, further comprising transmitting, by a second processor of the second electronic device, a wake-up state message to the first processor through the Ethernet line, in the booted state.

11. The method of claim 9, further comprising receiving, by a second processor of the second electronic device, data from the first processor through the Ethernet line, and performing an operation based on the data, in the booted state.

12. The method of claim 8, further comprising forming, by a second processor of the second electronic device, an Ethernet line with a sensor hub for exchanging data through a controller area network (CAN) communication with a plurality of sensors; and
   receiving, by the second processor, data generated by at least one of the plurality of sensors through an Ethernet communication method from the sensor hub.

* * * * *